United States Patent [19]
Everett et al.

[11] Patent Number: 5,715,431
[45] Date of Patent: Feb. 3, 1998

[54] TAMPER PROOF SECURITY MEASURE IN DATA WRITING TO NON-VOLATILE MEMORY

[75] Inventors: David B. Everett, East Sussex; Keith M. Jackson, West Sussex; Ian Miller, Surrey, all of United Kingdom

[73] Assignee: Mondex International Limited, London, United Kingdom

[21] Appl. No.: 351,451

[22] PCT Filed: Apr. 13, 1994

[86] PCT No.: PCT/GB94/00775

§ 371 Date: Feb. 3, 1995

§ 102(e) Date: Feb. 3, 1995

[87] PCT Pub. No.: WO94/24673

PCT Pub. Date: Oct. 27, 1994

[30] Foreign Application Priority Data

Apr. 13, 1993 [GB] United Kingdom ............... 9307623

[51] Int. Cl.⁶ ................................................. G06F 12/14
[52] U.S. Cl. .......................... 395/483; 235/492; 902/26
[58] Field of Search ............................ 395/430, 492, 395/483, 486, 182.04, 182.05, 182.13, 186, 217; 235/380; 365/185.33; 902/26; 257/922

[56] References Cited

U.S. PATENT DOCUMENTS

| 4,827,115 | 5/1989 | Uchida et al. | 235/492 |
| 5,200,600 | 4/1993 | Shinagawa | 235/492 |
| 5,365,045 | 11/1994 | Iijima | 235/380 |
| 5,386,539 | 1/1995 | Nishi | 395/430 |
| 5,390,148 | 2/1995 | Saito | 365/189.01 |
| 5,475,697 | 12/1995 | Katz et al. | 395/486 |
| 5,479,637 | 12/1995 | Lisimaque et al. | 395/430 |

FOREIGN PATENT DOCUMENTS

0 489 204 A1   6/1992   European Pat. Off.

*Primary Examiner*—Eddie P. Chan
*Assistant Examiner*—Hiep T. Nguyen
*Attorney, Agent, or Firm*—Nixon & Vanderhye P.C.

[57] ABSTRACT

A method of writing data to non-volatile memory such as electrically erasable programmable read only memory (EEPROM) in a smart card provides a write status region of EEPROM which is examined on each reset of the card. If the preceding write operation was unsuccessful, perhaps because of deliberate manipulation of the card, a recovery procedure is implemented. If recovery is successful, the card operation can be run. Otherwise the card is unusable.

15 Claims, 6 Drawing Sheets

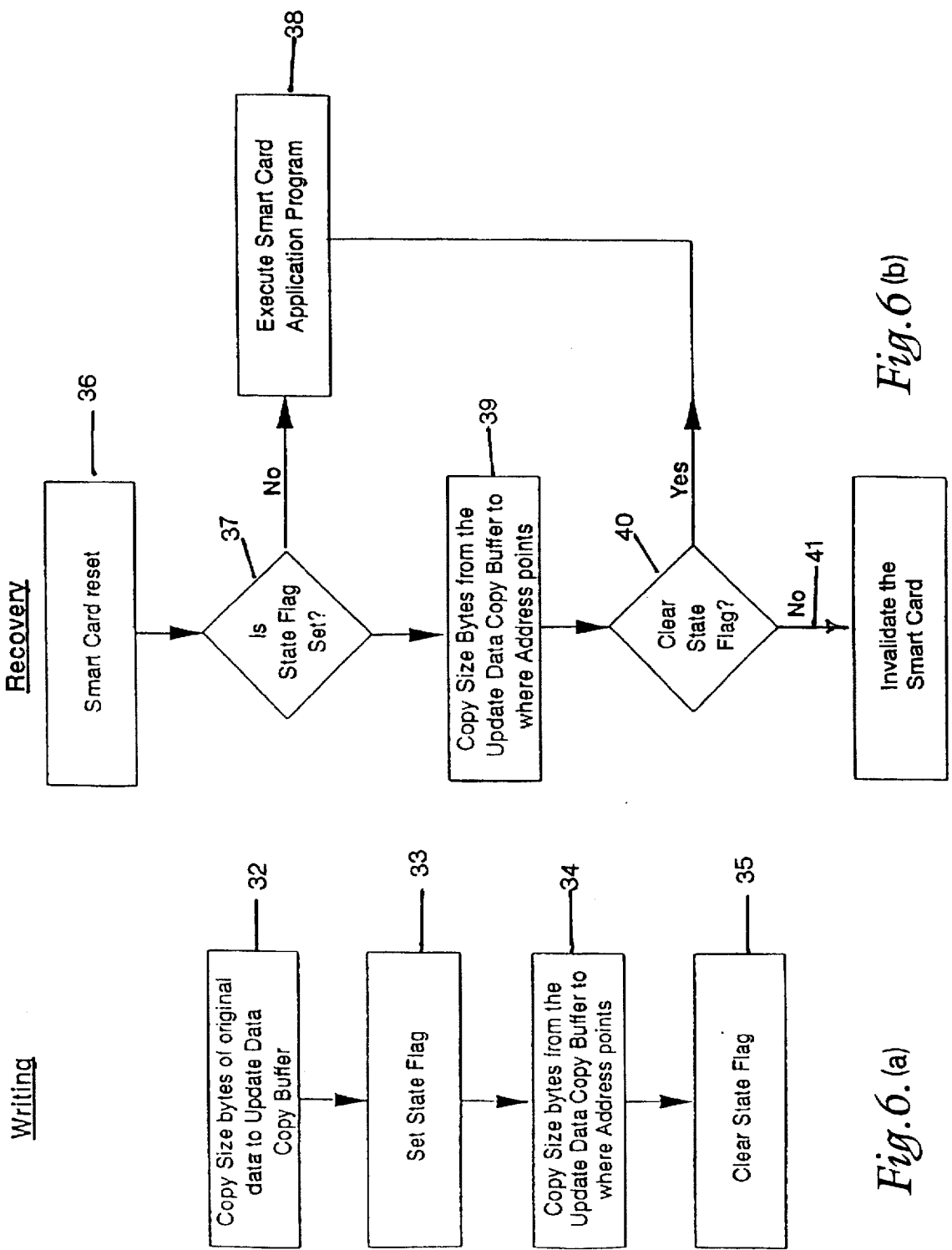

TAMPER PROOF SECURITY MEASURE IN DATA WRITING TO NON-VOLATILE MEMORY

BACKGROUND OF THE INVENTION

1. Field of the Invention

The invention relates to the writing of data to non-volatile memory. Non-volatile memory is memory which retains data without electrical power being maintained. In particular, the invention relates to the writing of data to memory in transportable integrated circuit devices which are used in conjunction with terminal devices with which they are temporarily coupled for data input and output. An example of such a transportable device is the integrated circuit card (ICC), otherwise known as a "smart card".

2. Discussion of Prior Art

Smart cards are coupled by means of an interface to a terminal device whereby power, clock signals, a reset signal and serial data signals may be applied to the card. Generally the interface incorporates a set of electrical contacts for direct temporary electrical connection. However, contactless interfaces employing electromagnetic induction techniques for the application of power have been proposed. In such an arrangement clock, reset and data signals may be coupled electromagnetically or by infra-red or ultra-sonic techniques. Transportable integrated circuit devices may be embodied in tokens of other than card shape. Regardless of shape, such devices will be referred to herein as integrated circuit cards (ICCs). A difficulty with ICCs is that the writing of data to the ICC may be interfered with by disturbing the interface during writing whereby transients or failure in power, reset or clock signals may result in erroneous write.

A smart card application to which the invention is particularly applicable is in a financial value or "electronic cash" transfer system. Here, data in smart cards represents value which can be transferred on-line with banks and off-line between cards. Such a system is described in patent applications Nos. WO91/16691 and WO93/08545. It is clearly important in such applications to avoid the effects of erroneous data writing, either accidental or perhaps deliberately instigated by manipulation of power or data lines. The present invention provides a solution.

SUMMARY OF THE INVENTION

According to the invention there is provided a method of writing data to non-volatile memory in an integrated circuit device, the device having an interface for temporary connection to a terminal unit; a microprocessor; random access memory and non-volatile memory, the method consisting in allocating a first region of the non-volatile memory for data to be written, allocating a second region of non-volatile memory for write status information to be written, performing a data write operation to write data to said first region, and writing information to said second region signifying a valid data write if, and only if, the data write operation is performed satisfactorily.

In a microprocessor environment there are many copy and write procedures for transferring data and program information between regions of RAM and from RAM to EEPROM, for example, and vice versa. At the operating system level or higher there are usually verification techniques available for verifying the validity of a copy or write operation. This may involve an automatic comparison of the copied or written material with the original or, more usually, the provision of a checksum routine which adds one or more checksum bits to the data which, in accordance with a particular algorithm, provide a link to the data which can be verified to ensure that no write or copy computation has taken place. If corruption is detected the operation can be repeated until satisfactory. The present invention is not concerned with such techniques and is additional to them, where provided. However, such inbuilt techniques can be used as the basis for determining whether the write operation has been performed satisfactorily in order to write the appropriate information into the second region of memory. Thus, for example, if data is successfully written to an ICC with inbuilt write verification techniques present then the conclusion of the write process can be taken as indication of a satisfactory write to allow appropriate data to be written to the second region of memory.

The type of non-volatile memory currently used in most smart cards is electrically erasable programmable read-only memory (EEPROM) and the invention is applicable particularly, but not exclusively to this. As far as reading and writing procedures are concerned EEPROM is generally divided into pages and reading or writing is carried out on one page only at a time. It can be expected that a transient writing error may corrupt the contents of one page but not others. Accordingly, it is preferred that the first and second regions are on different pages.

The invention allows the non-volatile memory to record whether there is an outstanding write error on the device and to take action accordingly when the device is used again, on application of a reset signal. Generally the protocol ISO 7816 is used, which governs the nature of reset, answer-to-reset, power and clock signals etc. If the fault is transient, the reset signal may be applied immediately so that an interrupted transaction may be resumed. If not, the reset signal is applied next time an attempt is made to use the device. Preferably, in accordance with an aspect of the invention there is provided a method of utilisation of an integrated circuit device to which data has been written as described above, the device including in the non-volatile memory an application program which controls the microprocessor to run a particular application under normal circumstances, the utilisation method including the step of initially reading the second portion of the non-volatile memory to derive write status information therefrom and, if the write status information indicates an incomplete write operation, by-passing said application program.

Thus, the action effective when an outstanding write error is present on a smart card (for example) may be to render the card useless by continued failure to run the application program. This is software invalidation of the card. Alternatively, a hardware invalidation is possible by providing an overload current to a fuse link in the card, thus blowing the fuse and rendering the card invalid. However, card invalidation is wasteful and preferably the method of utilisation includes, on detection of an incomplete write operation, a procedure of data recovery effective to restore the device to a condition in which the last data write is correct and the status information in the second region of memory reflects this. Should the data recovery procedure fail, then the above-mentioned software or hardware steps of invalidating the card may be taken.

As non-exhaustive examples of the way in which the invention may be used, three specific methods are proposed.

METHOD 1

In accordance with this method it is provided that respective and separate regions of the non-volatile memory are allocated as:

(a) a sequence register which is said second region of memory;

(b) a data copy buffer;

(c) a size register; and (d) an address register and allocating a region of RAM or non-volatile memory as (e) a data incremental buffer, the first region of non-volatile memory being identified in size and address by data written in memory regions (c) and (d), the method of writing consisting in:

1. ensuring that the buffer (e) contains a valid data increment;
2. placing a copy of data to be updated in the buffer (b);
3. incrementing the register (a);
4. incrementing the data at the first region of memory by the amount in buffer (e) and writing the incremental amount to the first region of memory; and
5. incrementing the sequence register (a).

With this method the recovery procedure, when the register (a) indicates recovery is necessary, consists in copying the original (unamended) data from buffer (b) to said first region of memory. This restores the situation to the position before the faulty write operation.

METHOD 2

In this method it is provided that respective and separate regions of the non-volatile memory are allocated as:

(f) a write in progress flag register, which is said second region of memory;

(g) a workspace pointer register;

(h) a size register; and (i) a data pointer register and allocating a region of RAM or non-volatile memory as (j) a new data pointer register, the first region of non-volatile memory being identified in size and position by data written in memory regions (g) and (h), the method of writing consisting in:

1. setting a workspace pointer in register (g) to the address of non-volatile memory workspace sufficient to hold a contiguous data set corresponding to a size set in register (h);
2. copying to the workspace a copy of new data identified in address by the new data pointer at (j) and in size by the size data at (h);
3. setting the write in progress flag at (f);
4. setting an address in data pointer register (i) to the address of the work-space; and
5. clearing the write in progress flag in register (f).

Here, the recovery procedure comprises repetition of the last two steps (4 and 5), since an error would indicate that the data pointer register had not been properly written.

METHOD 3

In this method it is provided that respective and separate regions of the non-volatile memory are allocated as:

(k) a state flag register which is said second region of memory;

(l) a size register;

(m) an address register; and (n) an update copy buffer the first region of non-volatile memory being identified in size and position by data written in registers (l) and (m), the method of writing consisting in:

1. copying new data to be written into buffer (n);
2. setting the state flat in register (k);
3. writing said new data to be written to said first region of non-volatile memory; and
4. clearing the state flag in register (k).

Here, new data is typically written directly from RAM and a copy is taken for the update copy buffer (n). If recovery is required, since it is the new data which is held in reserve in (n), the recovery procedure copies this to the required address in EEPROM (for example).

BRIEF DESCRIPTION OF THE DRAWINGS

The invention will further be described with reference to the accompanying drawings, of which:

FIGS. 6A–6B are a flow diagram in respect of the third method.

DETAILED DISCUSSION OF PREFERRED EMBODIMENTS

Figure 1:
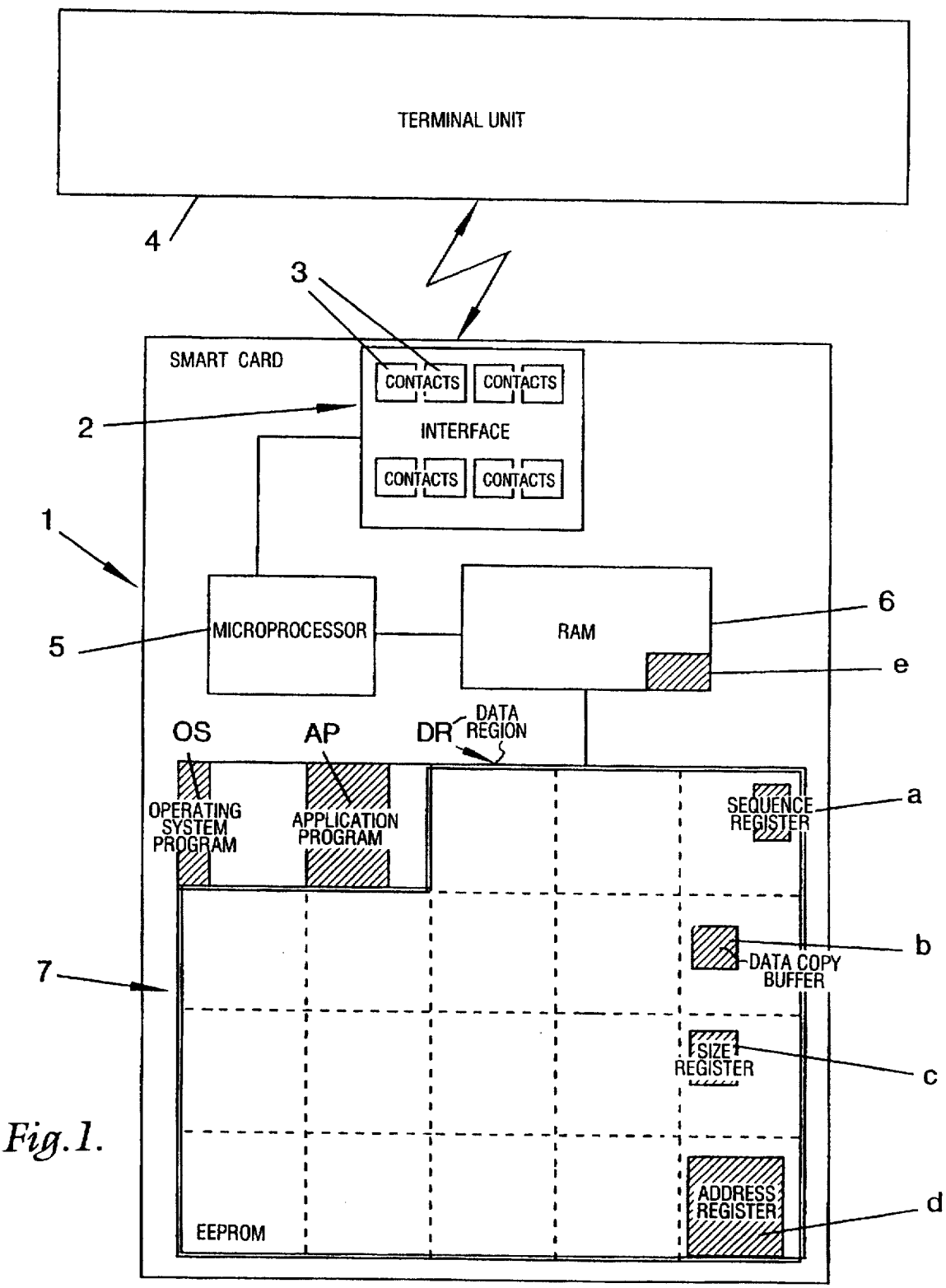
FIG. 1 is a schematic diagram of a smart card having EEPROM organised to effect a first method of data writing and recovery in accordance with the invention.

Referring to FIG. 1 there is shown a smart card 1 which has an interface 2 comprising a set of contacts 3 for making contact with a terminal unit 4. In accordance with the protocol of ISO 7816 the terminal unit provides power, clock signals, a reset signal and serial data signals to the card. The card is an ICC device which includes a microprocessor 5, RAM 6, and EEPROM 7.

The EEPROM 7 is divided into a set of pages 8 and is loaded with an operating system program OS, an application program AP and has a data region DR which holds data which may be read and rewritten.

A first example of the present invention is designated METHOD 1, which is for incremental updating of data in EEPROM. In accordance with this method respective and separate regions of the data region DR of EEPROM are allocated as:

(a) a sequence register;

(b) a data copy buffer;

(c) a size register; and (d) an address register.

A region of RAM is allocated as (e) a data incremental buffer, although this could alternatively be in EEPROM also.

Figure 2:
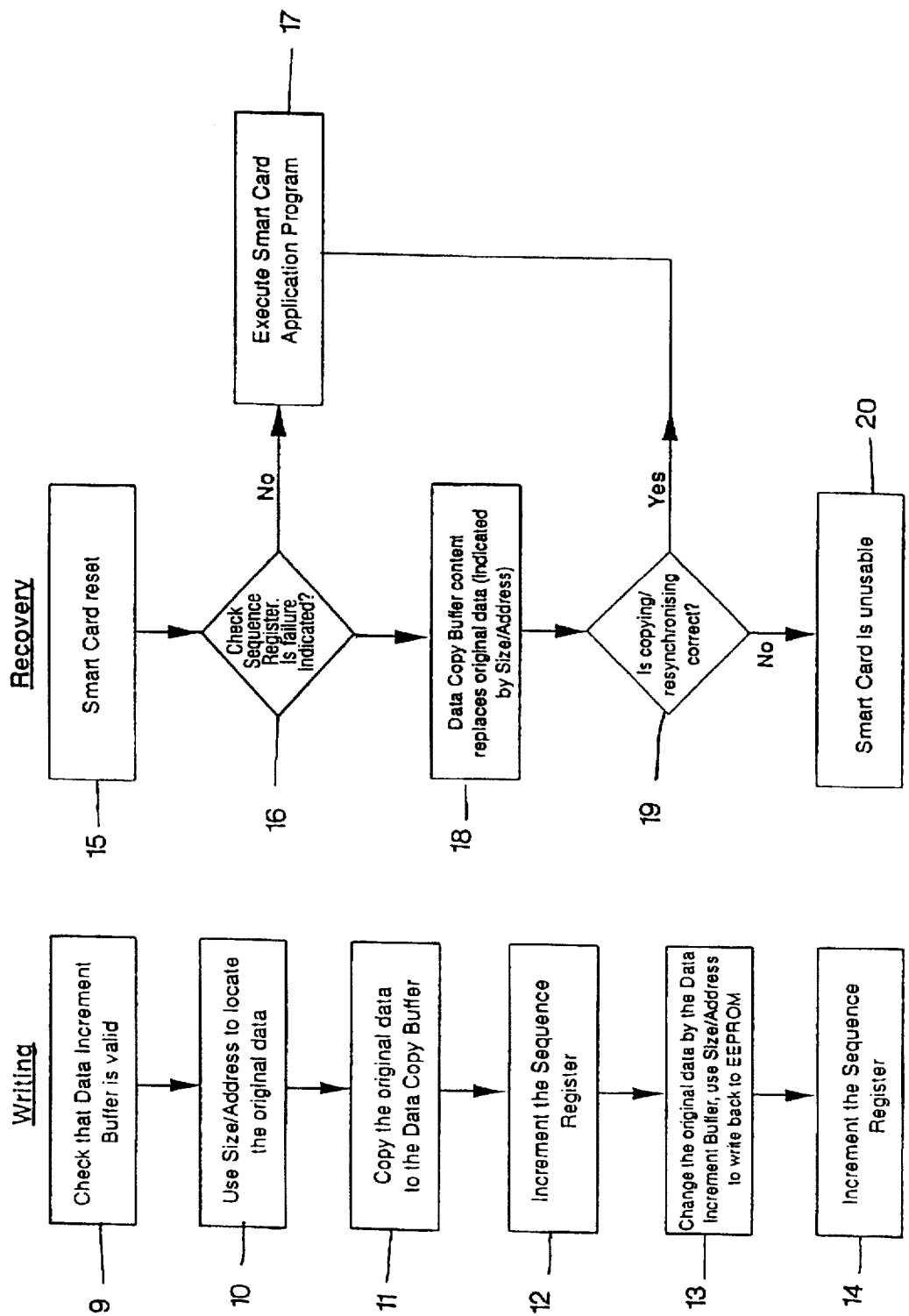
FIGS. 2a–2B are a flow diagram in respect of the method used in the card of FIG. 1.

Referring now to FIG. 2(a) there is shown a flow diagram for the writing of data in accordance with METHOD 1. The steps include:

1. ensuring that the buffer (e) contains a valid data increment (at 9);
2. identifying the EEPROM data to be updated (original data) by reference to the size and address registers (c), (d), giving the original location (at 10);
3. copying the original data to buffer (b) (at 11);
4. incrementing the sequence register (a) (at 12);
5. calculating the new data in RAM by reference to the original data and the data in the data increment buffer (e) and write the new data back to the original location in EEPROM (at 13); and 6. incrementing the register (a) (at 14).

EEPROM is such that its stored data can be corrupted if, whilst the content of the EEPROM is being changed, the power line, or the clock signal are interrupted. With the arrangement described above, data security is provided by the use of the data copy buffer in conjunction with the sequence register. By virtue of internal write verification procedures it can be assumed that if the operating system indicates completion of the write procedure 13 then the written information is in order and the sequence register (a) can be updated appropriately. If the write operation is interrupted by power line or clock signal disruption, for example, then the sequence register remains in its former state which is not appropriate to the attempted write.

In accordance with an aspect of the invention there is a check and recovery procedure available when the card receives the reset signal at any time. FIG. 2(b) illustrates this. On reset at 15 the sequence register is checked at 16 to determine whether a write failure is indicated. If not then the application program AP (FIG. 1) is executed at 17. If failure is indicated then the original data before the last attempted write operation, which is held in data copy buffer (b) is copied to the original data address (c), (d). This step is shown at 18. The situation before the attempted write operation is thus restored.

This method is adapted to a multi-stage operation procedure and in practice data will be fed back and forth to the terminal by a serial interface in multiple stages. The sequence register holds information as to the stage in the sequence where interruption takes place. If the original interconnection to the terminal pertains and the operation sequence can be resumed then a re-synchronisation procedure takes place and at 19 there is a check to determine whether copying/re-synchronisation has succeeded. If so then the application program AP is run. If not the software must decide from the state of the sequence register how to re-synchronise the on-card application software and the software communicating with the smart card via the serial line. If data cannot be retrieved from the data copy buffer, and the sequence register indicates that this data should be available, then the smart card is unusable, as indicated at 20.

This may be by virtue of continued failure to implement the application program or positive steps may be taken to invalidate the card as, for example, by blowing an inbuilt fuse.

The data copy buffer (b) and the data increment buffer (e) must both be large enough to hold the largest possible data block that will be written to EEPROM using this method. An extra 5 bytes of storage are also required (size=2 bytes, address=2 bytes, sequence register=1 byte [at least]). If size can never be greater than 255, then it can be stored in a single byte.

Since the card operates on only one page 8 (FIG. 1) at a time in writing, security is enhanced by ensuring that separate EEPROM pages (3 in total) are used for the data copy buffer, the data increment buffer and for the rest of the additional data.

Using this method of writing to EEPROM, the number of bytes actually written to EEPROM is doubled even if a recovery is not invoked (because a copy of the original data must be stored in the data copy buffer before the EEPROM write commences). The total overhead is actually slightly more than this as size, address, and sequence register information must also be written to EEPROM.

Figure 3:
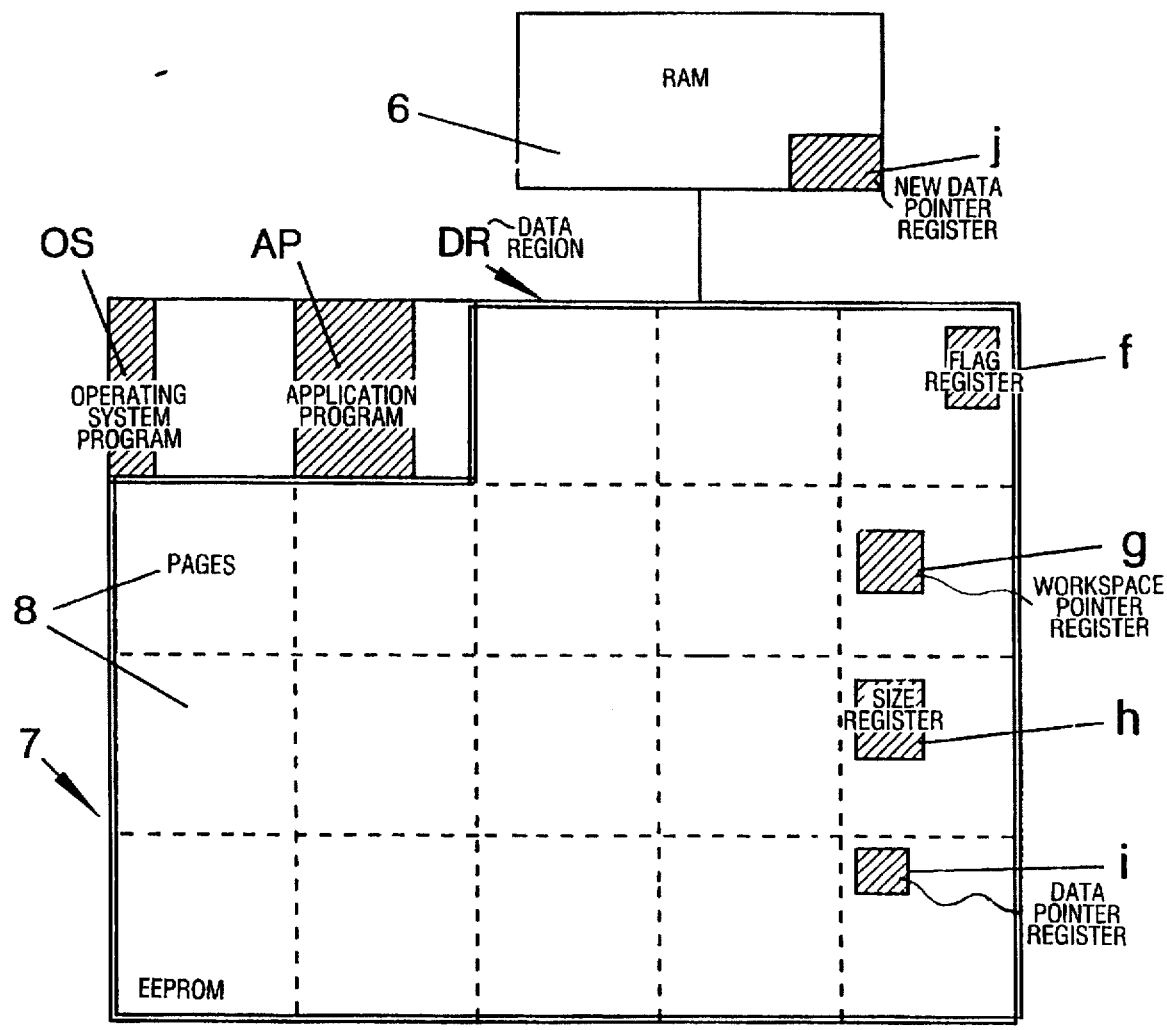
FIG. 3 is a schematic diagram similar to FIG. 1 but in respect of a second method of data writing and recovery in accordance with the invention.

Referring now to FIG. 3 there is shown the EEPROM configuration for a smart card (otherwise similar to that of FIG. 7) to use a METHOD 2 in accordance with the invention. Here respective and separate regions of EEPROM (on respective pages 8) are allocated as:

(f) a write in progress flag register;

(g) a workspace pointer register;

(h) a size register; and (i) a data pointer register.

In RAM there is allocated a region (j) as a new data pointer register. Alternatively this may also be in EEPROM.

Figures 4A, 4B:
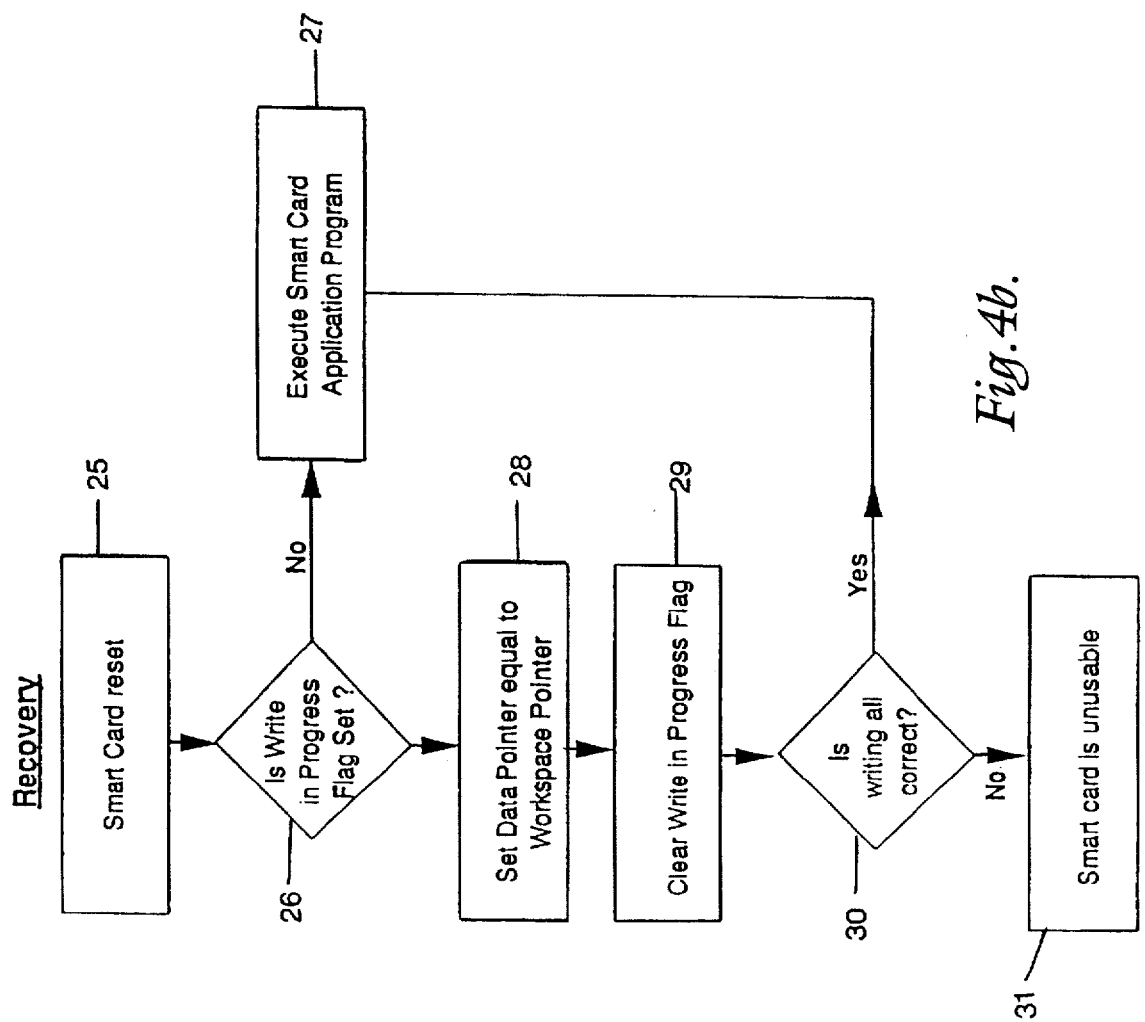
FIGS. 4A–4B are a flow diagram in respect of the second method.

A flow chart for the writing procedure in METHOD 2 is shown in FIG. 4(a). This includes the steps of:

1. setting a workspace pointer in register (a) to the address of a workspace in EEPROM sufficient in size to hold a contiguous data set corresponding to a size set in register (h) (at 21);

2. copying to the workspace a copy of new data in a region in RAM or EEPROM identified in size by register (h) and in position by register (i) (at 22);

3. setting the write in progress flat (f) (at 23);

4. setting the address in register (i) to the workspace address (at 24); and 5. clearing the write in progress flag in register (f).

The check and recovery procedure for METHOD 2 is shown in FIG. 4(b). On reset at 25 the write in progress flag is checked at 26. If cleared the application program AP is run at 27. If not then the last two steps (4 and 5) of the write procedure are repeated. Thus, the data pointer (i) is set equal to the workspace pointer (g) at 28 and the write in progress flag (f) is cleared at 29. If this write procedure succeeds (check at 30) the program AP is executed. If not, then the smart card is unusable (at 31).

If an area of EEPROM is found where an EEPROM write cannot be completed, then this method readily allows the smart card application software to mark this area as unusable (permanently), and choose another area for data storage. This can greatly extend the life of the smart card (which will very probably be limited by the maximum possible number of EEPROM writes that the smart card is capable of performing), however this is at the expense of maintaining a pointer (a 2 byte overhead) to each data structure stored in EEPROM.

Under normal conditions, the Write in Progress flag is only set for the time required to update a pointer in EEPROM. This is the minimum possible theoretical update time, which should help to ensure that the recovery mechanism is invoked only very rarely. This minimises the number of attempted writes to EEPROM, and thus extends the life of the smart card.

Each data structure written to EEPROM using this method will be extended by two bytes, as a pointer to the data must be continuously maintained. There is a small overhead on each EEPROM read as all data which uses this method must be accessed via a pointer.

The EEPROM pointed to by the Workspace Pointer must be large enough to hold the largest possible data structure that will be written to EEPROM using this method. This space is only required until the EEPROM write has been successfully completed, at which point an equivalent length of EEPROM storage (which used to contain the original data) is released. An extra 7 bytes of storage are also required (Write in Progress flag=1 byte, New Data Pointer =2 bytes, Workspace Pointer=2 bytes, Size =2 bytes). If Size can never be greater than 255, then it can be stored in a single byte.

Using this method of writing to EEPROM, the data structure is only written to EEPROM once, but three pointers have to be updated (the New Data Pointer, the Workspace Pointer and the Data Pointer—in that order). The Size, Address and Sequence Register information must also be written to EEPROM.

Figure 5:
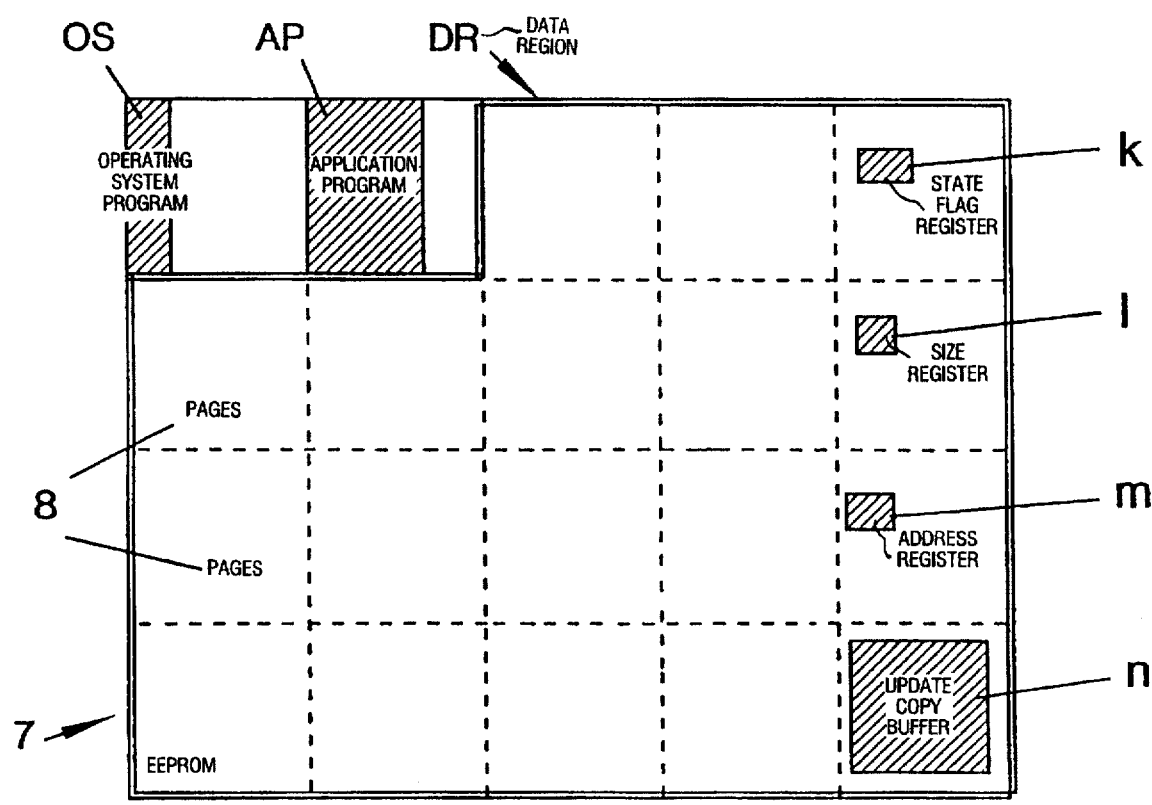
FIG. 5 is a schematic diagram similar to FIGS. 1 and 3 but in respect of a third method of data writing and recovery in accordance with the invention.

Referring now to FIG. 5 there is shown EEPROM allocation for a METHOD 3 of implementing the invention. It is to be understood that the EEPROM of FIG. 5 is incorporated in a smart card otherwise similar to that of FIG. 1. In FIG. 5, separate regions of EEPROM (on separate pages 8) are allocated as:

(k) a state flag register;

(l) a size register;

(m) an address register; and (n) an update copy buffer.

The writing procedure in METHOD 3 is illustrated in FIG. 6(a). The following steps are implemented:

1. Copy new data into buffer (n) (at 32);
2. Set state flag (k) (at 33);
3. Copy the new data to EEPROM region identified by size (l) and address (m) (at 34); and
4. Clear state flag (k) (at 35).

The check and recovery procedure illustrated in FIG. 6(b) has reset at 36, and a check for the setting of state flag (k) at 37. If the flag is not set then application program AP is run at 38. Otherwise the new data residing in buffer (n) is copied to the region (l), (m) at 39 and the state flag (k) is cleared at 40. If successful, the application program is run. If not, the card is useless (41).

An additional Data area (buffer n) must be large enough to store the largest amount of data which will be written to EEPROM, plus 5 bytes (Size=2 bytes, Address=2 bytes, State Flag—1 byte). If Size can never be greater than 255, then it can be stored in a single byte.

Using this method of writing to EEPROM, the number of bytes actually written to EEPROM is doubled even if a Recovery is not invoked (because a copy of the data must be written to EEPROM). The total overhead is actually slightly more than this as Size, Address must also be written to EEPROM.

To be able to tell that data has not been altered, error detection techniques must be implemented. Error detection usually comprises calculating a checksum whenever the data is updated, storing this checksum, and verifying that it is correct during every subsequent data read. The actual method used to calculate the error detection checksum is irrelevant for the purposes of this document, indeed some smart cards have error detection processes built into the EEPROM hardware, and their particular method of operation may well not be known.

An EEPROM write is deemed to be complete only when the error detection system has been appropriately updated, and has been verified correctly.

Each byte of EEPROM can only be changed a finite number of times before it ceases to function correctly. This is typically $10^5$ to $10^6$ write cycles. Therefore there is a finite chance of data being altered whilst it resides in EEPROM, and an EEPROM read must only be accepted as valid if the error detection system verifies that the data has not been altered. If an error is detected during an EEPROM read, it probably means that one or more bytes in the smart card's EEPROM have reached the end of their active life.

Using one of the methods of writing to EEPROM described above ensures that error correction (as opposed to error detection) is not required. Either the EEPROM operation takes place successfully, or the smart card is unusable. There are no circumstances in which an error needs to be corrected. This simplifies the software and reduces the data storage requirements, as error correction is computationally intensive and requires more dedicated bytes of storage than error detection.

One of the three methods of writing data to EEPROM described above (Method Number 1) explicitly keeps a counter (Sequence Register) which stores knowledge of the last successful operation in the series of operations performed during writing to EEPROM. Methods 2 and 3 may have, but do not explicitly require a counter of this type as they reply upon flags which hold information showing whether or not writing to EEPROM has successfully completed.

Even though a method of writing to EEPROM does not always explicitly require a numeric counter, it should be clearly noted that in many systems it will be necessary to maintain such a counter so that interrupted processes of any kind can be restarted. It is of course vitally important for this counter to be written to EEPROM in a secure manner, as if it is not correct it cannot be relied upon by smart card application software attempting to restart an interrupted process.

We claim:

1. A method of utilization of an integrated circuit device, the device having an interface for temporary connection to a terminal unit; a microprocessor; random access memory (RAM) and non-volatile memory, the method of utilization including:

a method of writing data to said non-volatile memory comprising:

allocating a first region of the non-volatile memory for data to be written, allocating a second region of non-volatile memory for write status information, performing a data write operation to write data to said first region, and writing information to said second region signifying a valid data write if, and only if, the data write operation is performed completely, and the method of utilization further including the method of responding to a reset of the device by the steps of:

initially reading the said second region of the non-volatile memory to derive write status information therefrom and, if the write status information indicates an incomplete write operation, enabling invalidation of the integrated circuit device.

2. A method of utilization of an integrated circuit device as claimed in claim 1 including the step of instituting recovery of data to the non-volatile memory, invalidation of the integrated circuit device being effected only on failure of said recovery.

3. A method of utilization of an integrated circuit device as claimed in claim 1 wherein the non-volatile memory includes an application program which controls the microprocessor to run a particular application under normal circumstances and invalidation of the integrated circuit device is software invalidation whereby said application program is by-passed.

4. A method of utilization of an integrated circuit device as claimed in claim 1 wherein invalidation of the integrated circuit device is effected by incapacitating the hardware of the device.

5. A method of utilization of an integrated circuit device as claimed in claim 1 wherein the non-volatile memory is divided into pages and write operations are performed on only one page at a time, the first and second regions of memory being on different pages.

6. A method of utilization of an integrated circuit device as claimed in claim 1 wherein the non-volatile memory is electrically erasable programmable read-only memory (EEPROM).

7. A method of utilization of an integrated circuit device as claimed in claim 1 wherein said second region of memory is a status register, said status information is indicative of the last satisfactorily performed stage of a multi-stage operation sequence and said data recovery procedure is effective to recover the multi-stage operation sequence from the stage at which it failed, as indicated by the status register.

8. A method of utilization of an integrated circuit device as claimed in claim 7 wherein respective and separate regions of the non-volatile memory are allocated as:
   a. a sequence register which is said second region of memory;
   b. a data copy buffer;
   c. a size register; and
   d. an address register and allocating a region of RAM or non-volatile memory as (e) a data incremental buffer, said first region of non-volatile memory being identified in size and address by data written in memory regions (c) and (d), said method of writing comprising:
      1. ensuring that the buffer (e) contains a valid data increment;
      2. placing a copy of data to be updated in the buffer (b);
      3. incrementing the register (a);
      4. incrementing the data at the first region of memory by the amount in buffer ((e) and writing the incremental amount to the first region of memory; and
      5. incrementing the sequence register (a).

9. A method of utilization of an integrated circuit device as claimed in claim 8 wherein the recovery procedure includes copying the data from the data buffer (b) to said first region of memory.

10. A method of utilization of an integrated circuit device as claimed in claim 1 wherein said second region of memory is a flag region and said status information is a flag which is set if said write operation is verified as satisfactory and which is otherwise not set.

11. A method of utilization of an integrated circuit device as claimed in claim 10 wherein respective and separate regions of the non-volatile memory are allocated as:
   f. a write in progress flag register, which is said second region of memory;
   g. a workspace pointer register;
   h. a size register; and
   i. a data pointer register and allocating a region of RAM or non-volatile memory as (i) a new data pointer register, said first region of non-volatile memory being identified in size and position by data written in memory regions (g) and (h), said method of writing comprising:
      1. setting a workspace pointer in register (g) to the address of non-volatile memory workspace sufficient to hold a contiguous data set corresponding to a size set in register (h);
      2. copying to the workspace a copy of new data identified in address by the new data pointer at (j) and in size by the size data at (h);
      3. setting the write in progress flag at (f);
      4. setting an address in data pointer register (i) to the address of the workspace; and
      5. clearing the write in progress flag in register (f).

12. A method of utilization of an integrated circuit device as claimed in claim 11 wherein the recovery procedure comprises the steps of setting the address in data pointer register (i) to the address of the workspace and clearing the write in progress flag in register (f).

13. A method of utilization of an integrated circuit device as claimed in claim 10 wherein respective and separate regions of the non-volatile memory are allocated as:
   k. a state flag register which is said second region of memory;
   l. a size register;
   m. an address register; and
   n. an update copy buffer said first region of non-volatile memory being identified in size and position by data written in registers (l) and (m), said method of writing comprising:
      1. copying new data to be written into buffer (n);
      2. setting the state flag in register (k);
      3. writing said new data to be written to said first region of non-volatile memory; and
      4. clearing the state flag in register (k).

14. A method of utilization of an integrated circuit device as claimed in claim 13 wherein the recovery procedure comprises the steps of copying the contents of the update copy buffer (n) to said first region of non-volatile memory identified by the contents of the registers (l) and (m) and clearing the flag in register (k).

15. An integrated circuit card (ICC) device comprising:
   an interface for temporary connection to a terminal unit;
   a microprocessor responsive to said interface;
   a random access memory (RAM) connected to said microprocessor; and
   a non-volatile memory connected to said microprocessor, said non-volatile memory further including:
      a first region for storing data to be written,
      a second region for storing write status information, said microprocessor including programming:
         for performing a data write operation to write data to said first region;
         for performing a data write operation to said second region signifying a valid data write status if, and only if, the data write operation to said first region is performed completely;
         for reading, in response to a reset of the device, said second region of the non-volatile memory to derive write status information therefrom; and
         enabling, if the write status information indicates an incomplete write operation, invalidation of the integrated circuit device.

* * * * *